United States Patent
Duan et al.

(10) Patent No.: US 10,979,364 B1
(45) Date of Patent: Apr. 13, 2021

(54) USER DEFINED QUALITY-CONTROL RESOURCE USAGE

(71) Applicant: Microsoft Technology Licensing, LLC, Redmond, WA (US)

(72) Inventors: Qing Duan, Santa Clara, CA (US); Qingyun Wan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/846,023

(22) Filed: Apr. 10, 2020

(51) Int. Cl.
| | |
|---|---|
| *H04L 12/927* | (2013.01) |
| *H04L 12/911* | (2013.01) |
| *G06N 20/00* | (2019.01) |
| *H04L 12/923* | (2013.01) |
| *H04L 29/08* | (2006.01) |

(52) U.S. Cl.
CPC ........... *H04L 47/805* (2013.01); *G06N 20/00* (2019.01); *H04L 29/08468* (2013.01); *H04L 29/08477* (2013.01); *H04L 47/762* (2013.01); *H04L 47/781* (2013.01); *H04L 47/808* (2013.01); *H04L 67/108* (2013.01)

(58) Field of Classification Search
CPC ......... H04L 29/08477; H04L 29/08468; H04L 67/1078; H04L 67/108; H04L 47/858; H04L 47/781; H04L 47/762; G06N 20/00
See application file for complete search history.

(56) References Cited

U.S. PATENT DOCUMENTS

| | | | |
|---|---|---|---|
| 6,263,371 B1* | 7/2001 | Geagan, III | H04L 1/22 375/E7.023 |
| 10,628,228 B1* | 4/2020 | Theunissen | H04L 41/5054 |
| 10,860,372 B1* | 12/2020 | Bai | G06F 16/122 |
| 2002/0073013 A1* | 6/2002 | Haddad | G06Q 40/04 705/37 |
| 2008/0183794 A1* | 7/2008 | Georgis | H04L 29/0845 709/201 |
| 2013/0254329 A1* | 9/2013 | Lin | H04L 69/329 709/217 |
| 2017/0272792 A1* | 9/2017 | Bachmutsky | H04N 21/632 |
| 2019/0266633 A1* | 8/2019 | Pujet | G06Q 30/0273 |
| 2020/0160373 A1* | 5/2020 | Thimmaiah | G06Q 30/0244 |

* cited by examiner

*Primary Examiner* — Aftab N. Khan
(74) *Attorney, Agent, or Firm* — Schwegman Lundberg & Woessner, P.A.

(57) ABSTRACT

Techniques for user-defined quality control of resource usage are provided. In one technique, resource split data is received that indicates a split of a total resource amount that is associated with a content delivery campaign. In response, based on the split, a first resource amount and a second resource amount is determined, each a subset of the total resource amount. The first resource amount is associated with a first utilization strategy and a first mapping function and the second resource amount is associated with a second utilization strategy and a second mapping function. In response to receiving a request from a client device, an entity of the client device is determined and associated with the first mapping function. A quality score of the entity is determined and, based on the first mapping function and the quality score, an adjustment factor is determined. A content item selection event is conducted based on the adjustment factor.

18 Claims, 6 Drawing Sheets

USER DEFINED QUALITY-CONTROL RESOURCE USAGE

TECHNICAL FIELD

The present disclosure relates to electronic controls in responding to content requests and, more particularly to, allowing users to define quality controls in how resources are utilized in responding to those content requests.

BACKGROUND

Content providers rely on computer technology to distribute their respective content over computer networks to computing devices end users. Some content providers rely on third party content distribution platforms to distribute their respective content. Content distribution platforms implement varying sophistication on how content is distributed. For example, some content distribution platforms allow content providers to specify attributes or characteristics of end user computing devices and/or the end users themselves to limit who will receive the content providers' content.

However, even for content providers who leverage such content distribution platforms, content providers have no control on how a content distribution platform utilizes resources when distributing the content providers' content. For example, one content provider might desire to maximize audience coverage for a first opportunity posting while another content provider might desire to maximize quality of applicants to a second opportunity posting. In other words, content providers' resource utilization intention is not taken into consideration while the content distribution platform utilizes the resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for user-defined quality control of resource usage are provided. In one technique, a content provider is allowed to specify how resources pertaining to a content delivery campaign are utilized, whether in a conservative manner or an aggressive manner. For example, a content provider specifies a 30/70 split, where 30% of content requests are processed in a conservative manner (or 30% of the resources associated with the campaign are processed in the conservative manner) and a 70% of content requests are processed in an aggressive manner.

Given a content delivery campaign and a user-specified split of resources, each member of a target audience of a content delivery campaign is identified and scored (e.g. using one or more machine-learned models) and a histogram of the scores is generated. Each score maps to a percentile or quantile. In response to a content request from a computing device of a target audience member, (1) a score for that member is determined and is used to look up a relative quality score and (2) the content request is assigned to one of the resource splits. Each resource split is associated with a different mapping function that maps a relative quality score to an adjustment factor. The adjustment factor is used to generate a final score for the content delivery campaign. The final score of the content delivery campaign is used to determine whether to select the content delivery campaign or one or more other content delivery campaigns.

Embodiments improve computer-related technology by allowing content providers to control how resources are utilized in distributing digital content items over a computer network to multiple target entities according to various objectives, such as maximizing target entity quality and maximizing audience coverage. Present content delivery systems do not take into account the resource utilization intention of content providers while managing their content delivery campaigns. Embodiments involve new computer technology that implements a data driven approach to conducting content item selection events that accounts for target entity quality measures and user-defined resource divisions.

System Overview

Figure 1:
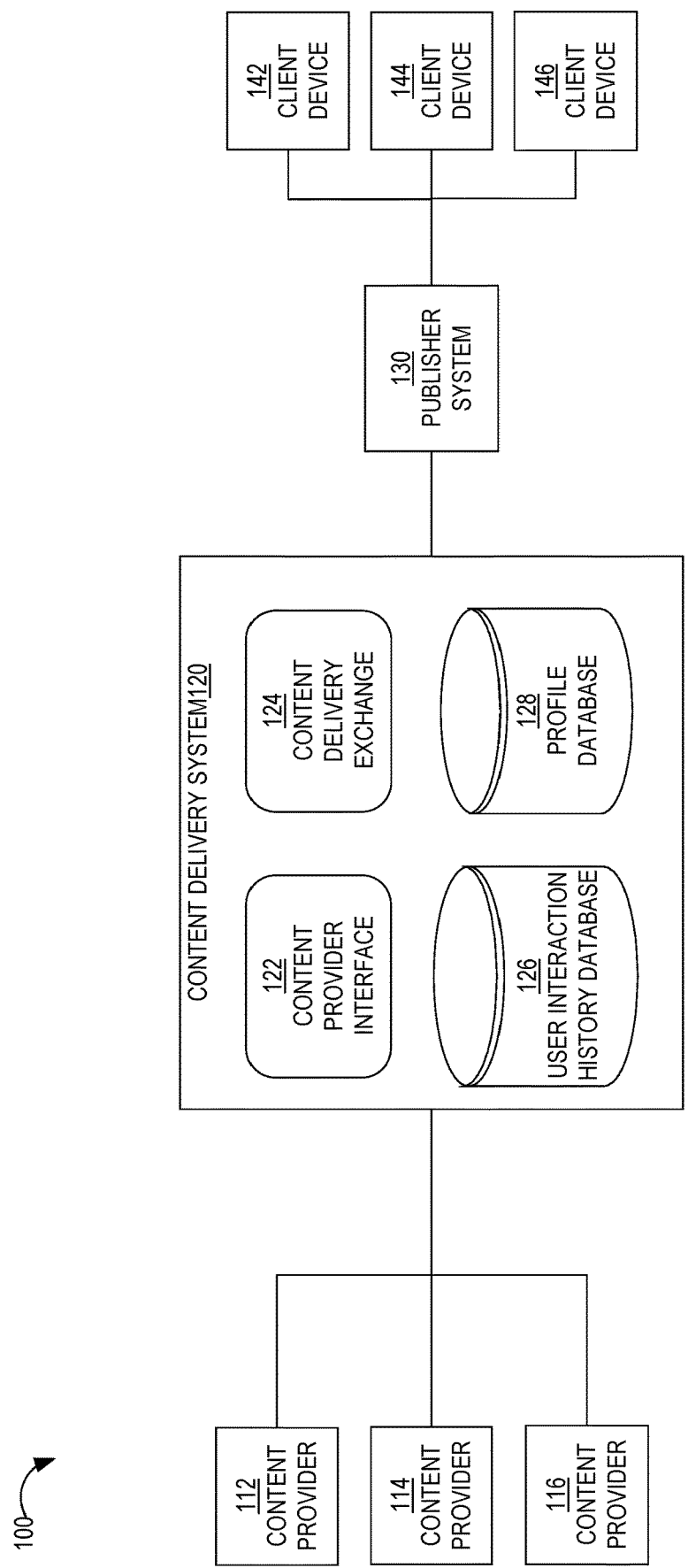
FIG. 1 is a block diagram that depicts an example system for identifying and transmitting content items over a computing network, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

Examples of content providers include employers, recruiters, and advertisers. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device. Examples of subject matter of a content item vary greatly, depending on the content provider of the content item, such as available employment opportunities or jobs, software products, vehicles, entertainment, financial products, and civic events. Thus, a content item may be a job posting or an advertisement of a product or service.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus and DoubleClick. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of the target entity, or user, that initiated the content request, attributes of a computing device operated by the target entity, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, target entities are assigned to content delivery campaigns (or specific content items within campaigns) "off-line"; that is, before content delivery exchange 124 receives a content request that is initiated by the target entity. For example, when a content delivery campaign is created based on input from a content provider, one or more computing components may compare the targeting criteria of the content delivery campaign with attributes of many target entities to determine which users are to be targeted by the content delivery campaign. If a target entity's attributes satisfy the targeting criteria of the content delivery campaign, then the target entity is assigned to a target audience of the content delivery campaign. Thus, an association between the target entity and the content delivery campaign is made. Later, when a content request that is initiated by the target entity is received, all the content delivery campaigns that are associated with the target entity may be quickly identified, in order to avoid real-time (or on-the-fly) processing of the targeting criteria. Some of the identified campaigns may be further filtered based on, for example, the campaign being deactivated or terminated, the device that the target entity is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), a target entity quality score, and/or bid price. Each content delivery campaign may be associated with a bid price that represents how much the corresponding content provider is willing to pay (e.g., content delivery system 120) for having a content item of the campaign presented to a target entity or selected by a target entity. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), objective measures of quality of the target entity, budget pacing (which controls how fast a campaign's budget is used and, thus, may limit a content item from being displayed at certain times), frequency capping (which limits how often a content item is presented to the same target entity), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of a target entity to which the selected content item(s) will be presented, an indication of whether a content item from each campaign was presented to the target entity, a predicted CTR of each campaign, and a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content items, across client devices 142-146 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a target entity interacted with a content item that exchange 124 delivered to a client device of the target entity. Examples of "user interaction" with a content item include viewing the content item (or a video thereof) for more than two seconds or selecting the content item, such as "clicking" the content item with a cursor control device or selecting the content item with a finger on a touchscreen display. Content delivery system 120 stores such data as user interaction data, such as an impression data set and/or an interaction data set. Thus, content delivery system 120 may include a user interaction history database 126. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a content item selection event identifier, a particular publisher or source (e.g., onsite v. offsite), a particular client device that displayed the specific content item (e.g., through a client device identifier), and/or a user identifier of a target entity that operates the particular client device. Thus, if content delivery system 120 manages delivery of multiple content items, then different impression data items may be associated with different content items. One or more of these individual data items may be encrypted to protect privacy of the target entity.

Similarly, an interaction data item may indicate a particular content item, a date of the user interaction, a time of the user interaction, a particular publisher or source (e.g., onsite v. offsite), a particular client device that displayed the specific content item, and/or a user identifier of a target entity that operates the particular client device. If impression data items are generated and processed properly, an interaction data item should be associated with an impression data item that corresponds to the interaction data item. From interaction data items and impression data items associated with a content item, content delivery system 120 may calculate an observed (or actual) user interaction rate (e.g., CTR) for the content item. Also, from interaction data items and impression data items associated with a content delivery campaign (or multiple content items from the same content delivery campaign), content delivery system 120 may calculate a user interaction rate for the content delivery campaign. Additionally, from interaction data items and impression data items associated with a content provider (or content items from different content delivery campaigns initiated by the content item), content delivery system 120 may calculate a user interaction rate for the content provider. Similarly, from interaction data items and impression data items associated with a class or segment of users (or users that satisfy certain criteria, such as users that have a particular job title), content delivery system 120 may calculate a user interaction rate for the class or segment. In fact, a user interaction rate may be calculated along a combination of one or more different target entity and/or content item attributes or dimensions, such as geography, job title, skills, content provider, certain keywords in content items, etc.

Job Context

As noted herein, a content item may be a job posting or job recommendation that references a job posting, which is about a job opportunity, described in more detail herein. Thus, in the job context, a content delivery campaign is a campaign to electronically deliver a job posting (or data that references a job posting) over a computer network to multiple potential job applicants. In this context, a content provider may be a job poster and users of client device 142-146 are potential job applicants that may be presented with job postings or job recommendations. A job posting includes information about a job or employment opportunity, such as job title, job function, job industry, skills required for the job, optional skills for the job, one or more locations in which the job is to be performed, and a description of the responsibilities and duties of the job.

A "job" is a task or piece of work. A job may be voluntary in the sense that the job performer (the person who agreed to perform the job) has no expectation of receiving anything in exchange, such as compensation, a reward, or anything else of value to the job performer or another. Alternatively, something may be given to the job performer in exchange for the job performer's performance of the job, such as money, a positive review, an endorsement, goods, a service, or anything else of value to the job performer. In some arrangements, in addition to or instead of the job provider, a third-party provides something of value to the job performer, such as academic credit to an academic institution.

A job poster is an individual, an organization, or a group of individuals responsible for posting information about a job opportunity. A job poster may be different than the entity that provides the job (i.e., the "job provider"). For example, the job poster may be an individual that is employed by the job provider. As another example, the job poster may be a recruiter that is hired by the job provider to create one or more job postings (also referred to herein as opportunity postings). A job provider may be an individual, an organization (e.g., company or association), or a group of individuals that require, or at least desire, a job to be performed.

A "job opportunity" is associated with a job provider. If a candidate for a job opportunity is hired, then the particular entity becomes the employer of the candidate. A job opportunity may pertain to full-time employment (e.g., hourly or salaried), part-time employment (e.g., 20 hours per week), contract work, or a specific set of one or more tasks to complete, after which employment may automatically cease with no promise of additional tasks to perform.

A "job seeker" is a person searching for one or more jobs, whether full-time, part-time, or some other type of arrangement, such as temporary contract work. A job seeker becomes an applicant for a job opportunity when the job seeker applies to the job opportunity. Applying to a job opportunity may occur in one of multiple ways, such as submitting a resume online (e.g., selecting an "Apply" button on a company page that lists a job opportunity, selecting an "Apply" button in an online advertisement displayed on a web page presented to the job seeker, or sending a resume to a particular email address) or via the mail, or confirming with a recruiter that the job seeker wants to apply for the opportunity.

A "job application" is a set of data about a job applicant submitted for a job opportunity. A job application may include a resume of the applicant, contact information of the applicant, a picture of the applicant, an essay provided by the applicant, answers to any screening questions, an indication of whether any one of one or more assessment invitations have been sent to the applicant, an indication of whether the applicant completed any of the one or more assessments, and results of any assessments that the applicant completed. A resume or other parts of a job application may list skills, endorsements, and/or qualifications that are associated with the applicant and that may be relevant to (e.g., match the characteristics of, or are determined to be similar to (in a quantitative way, such as using word embeddings)) the job opportunity.

A "reviewer" is an individual, an organization, or a group of individuals responsible for reviewing applications for one or more job opportunities. A reviewer may be the same entity as the job poster. For example, a reviewer and the corresponding job poster may refer to the same company. Alternatively, a reviewer and the corresponding job poster may be different individuals associated with (or otherwise affiliated with) the same company. In that situation, one person is responsible for posting a job and another person is responsible for reviewing applications. Alternatively, a reviewer may be affiliated with a different party than the job poster. In fact, the job provider, the job poster, and the reviewer may be different parties/companies.

Profile Database

In order to intelligently target content items (e.g., whether job postings or advertisements) to users of client devices 142-146, content delivery system 120 has access to a profile database 128. Although depicted as part of content delivery system 120, profile database 128 may be part of publisher system 130 or another system not depicted in FIG. 1.

Profile database 128 stores multiple entity profiles. Each entity profile in profile database 128 is provided by a different user. Example entities include users, groups of users, and organizations (e.g., companies, associations, government agencies, etc.). Each entity profile is provided by a different user or group/organization representative. An organization profile may include an organization name, a website, one or more phone numbers, one or more email addresses, one or more mailing addresses, a company size, a logo, one or more photos or images of the organization, an organization size, and a description of the history and/or mission of the organization. A user profile may include a first name, last name, an email address, residence information, a mailing address, a phone number, one or more educational/academic institutions attended, one or more academic degrees earned, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, colleague of the user.

Content delivery system 120 or publisher system 130 may prompt users to provide profile information in one of a number of ways. For example, publisher system 130 may have provided a web page with a text field for one or more of the above-referenced types of information. In response to receiving profile information from a user's device, publisher system 130 stores the information in an account that is associated with the user and that is associated with credential data that is used to authenticate the user to publisher system 130 when the user attempts to log into publisher system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, content delivery system 120 or publisher system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by publisher system 130 (or another automatic process). For example, a user specifies, in his/her profile, a name of the user's employer. Publisher system 130 determines, based on the name, where the employer and/or user is located. If the employer has multiple offices, then a location of the user may be inferred based on an IP address associated with the user when the user registered with a social network service (e.g., provided by publisher system 130) and/or when the user last logged onto the social network service.

Tunable Quality Control Factor

Different content providers may have different goals or objectives with respect to how aggressively to distribute content items to target entities based on target entity quality. For example, some content providers may wish to aggressively distribute content items to target entities regardless of the quality measures of those target entities, while other content providers may wish to conservatively distribute content items to target entities and, thus, may be willing to only boost scores of target entities who have high quality measures. The "quality" of a target entity refers to an objective measure of a likelihood that the target entity will perform a particular action, such as accepting an offer of employment, filling out a web form, purchasing a product, or visiting a geographical location.

In an embodiment, a content provider is able to provide input that specifies how a resource of a content delivery campaign is divided into different portions that content delivery system 120 utilizes differently. Examples of a resource of a content delivery campaign include (a) a monetary amount that the content provider of the campaign is willing to pay content delivery system 120 for distributing content item(s) from the content delivery campaign and (b) a number of content requests that are allocated to the content delivery campaign (or that content delivery system 120 is willing to use the content delivery campaign to fulfill).

The input that specifies how the resource is divided may be received during creation of the content delivery campaign. The input may comprise multiple numbers (e.g., 30 and 70, or 10, 35, and 55) or may be input that moves a slider that indicates a split or division of a resource. The specified numbers or the numbers presented as a result of selecting a split may be relative numbers (e.g., percentages) or absolute numbers in the case where the total resources of the content delivery campaign is known. For example, if a content provider allocates 87 units to a content delivery campaign, then the content provider may specify (e.g., in different text fields of a user interface) 30 units for one split and 57 units for another split; alternatively, the content provider may modify a slider that causes a user interface to update at least two values, each between 0 and 87. The user interface may present, adjacent to the numbers, data that reflects resource utilization intentions. Such data may include text (e.g., "Aggressive," "Moderate," and "Conservative"), numbers that correspond to different portions of an aggressive/conservative scale, and/or graphics whose colors reflect a different portion of the aggressive/conservative scale.

Resource Portions

Each portion of a resource (of a content delivery campaign) that results from one or more splits or divisions of the resource based on content provider input is referred to as a "resource portion." For example, if a content provider moves a slider that indicates a 30/70 split, then there are two resource portions: one portion that is 30% of the resource and the other portion that is 70% of the resource. If a content provider specifies 10, 40, and 50, then there are three resource portions: one portion that is 10% of the resource, another portion that is 40% of the resource, and another portion that is 50% of the resource.

Utilization Strategies and Adjustment Factors

Each resource portion is associated with (or assigned) a utilization strategy. Example utilization strategies include aggressive, moderate, conservative, and no adjustment. A utilization strategy is associated with an adjustment factor. An adjustment factor increases or decreases a score for a content delivery campaign (or an associated content item).

For example, an adjusted score=score*adjustment_factor. In this example, an adjustment factor of one has no effect on the score, while adjustment factor values greater than one have an increasing effect on the score and adjustment factor values less than 1 (e.g., between 0 and 1) have a decreasing effect on the score.

An aggressive utilization strategy causes an adjustment factor for target entities to be higher for at least some target entities, such as relatively high quality target entities and/or relatively low quality target entities. A conservative utilization strategy causes an adjustment factor for target entities to be lower for at least some target entities, such as relatively high quality target entities and/or relatively low quality target entities. A moderate utilization strategy causes an adjustment factor for target entities to be higher (but not as high as the adjustment factor associated with an aggressive utilization strategy) for at least some target entities.

A no adjustment utilization strategy effectively turns off the adjustment factor (or cause the value of the adjustment factor to be 1). Thus, a "traditional" scoring approach for scoring a content delivery campaign (or a content item thereof) may be used, such as a bid price of the content delivery campaign or a product of the bid price and a predicted user interaction (e.g., click or view) rate.

Target Entity Quality Score

Each target entity is associated with a quality score that reflects a quality of the target entity with respect to one or more objectives. The quality score may reflect a likelihood that the target entity will perform one or more actions corresponding to the one or more objectives. In the job context, example objectives that an opportunity provider (or content delivery system 120 or publisher system 130) has for target entities include an opportunity provider hiring a target entity, the opportunity provider requesting an interview with the target entity, the target entity applying to an opportunity posting provided by the opportunity provider, and the target entity selecting (e.g., clicking on) an opportunity posting provided by the opportunity platform. Thus, for example, if a target entity has a relatively high predicted likelihood to be hired by an opportunity provider based on a job posting of the opportunity provider, then the quality score for the target entity (with respect to the content item) is relatively high.

In the ad context, one or more objectives that content providers might have for target entities include one or more target entity actions, such as clicking on a content item, viewing the content item for a certain length of time, filling out an electronic form, scrolling through a particular web page, downloading a certain software application, or purchasing a product or service. Thus, for example, if a target entity has a relatively high likelihood to purchase a particular product, based on a content item of a content provider, then the quality score for the target entity (with respect to the content item) is relatively high.

A quality score for a target entity may be generated in one or more ways. For example, a model may take multiple features values of the target entity, the content item, the context of the content request, or any combination thereof, and generate a quality score. The model may be a rule-based model or a machine-learned model.

Machine-Learned Model

In an embodiment, one or more models are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users and regions. The statistical model is trained based on multiple attributes (or factors) described herein. In machine learning parlance, such attributes are referred to as "features." To generate and train a statistical prediction model, a set of features is specified and a set of training data is identified.

Embodiments are not limited to any particular machine learning technique for generating a quality score model. Example machine learning techniques include linear regression, logistic regression, random forests, naive Bayes, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

A machine-learned model may output different types of data or values, depending on the input features and the training data. For example, training data may comprise, for each user, multiple feature values, each corresponding to a different feature. Example features include profile features (e.g., job title, seniority, industry, geographic location, years of experience, degrees earned, academic institutions attended) and online activity features (e.g., online messages sent, number of job applications submitted, number of clicks of content items of a particular type, etc.). In order to generate the training data, information about a target entity indicated or identified in user impression data is analyzed to compute the different feature values. Depending on the context, the dependent variable of each training instance may be whether the target entity was hired after selecting a content item (corresponding to the training instance) from a certain content/opportunity provider or whether the target entity performed another type of action (e.g., making a purchase) after selecting the content item.

The training data may include negative training instances, each corresponding to a target entity that did not perform the particular action (e.g., get hired or make a purchase) in after being presented with a corresponding content item. The training data may be modified to include at least a certain percentage of positive instances, such as 10% of all training instances in the training data. For example, randomly-selected negative instances may be removed and/or positive instances may be copied or sampled.

Initially, the number of features that are considered for training may be significant. After training and validating a model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features with little predictive power may be removed from the training data. Removing such features can speed up the process of training future models and making predictions.

Quality Score Histogram

Different target audiences of different content delivery campaigns may be associated with different distributions of quality scores. For example, potential job applicants of a first job posting may have relatively high quality scores (e.g., 90% of potential job applicants between 0.8 and 0.9, indicating a high likelihood of accepting an offer of employment) while potential job applications of a second job posting may have relatively low quality scores (e.g., 90% of potential job applicants between 0.1 and 0.2 indicating a low likelihood of accepting an offer of employment). Therefore, even though two job applicants of the different job postings may be associated with the same quality score (e.g., 0.5), the job applicant of the second job posting would be considered a high quality applicant (relative to other potential job applicants to the second job posting) while the job applicant of the first job posting would be considered a low quality applicant (relative to other potential job applicants to the first job posting).

In order to determine an adjustment factor for a target entity relative to a content delivery campaign, a relative quality score is determined. A relative quality score is a quality score that is based on quality scores of other target entities of the content delivery campaign. In order to determine a relative quality score, a histogram of quality scores of multiple (e.g., all) target entities of the content delivery campaign is generated. The target entities of a content delivery campaign are entities that are targeted by the content delivery campaign as determined by the targeting criteria of the content delivery campaign. Content delivery system 120 may determine the target entities of a content delivery campaign immediately upon receipt of the targeting criteria or some time prior to the start of the content delivery campaign.

The histogram represents an ordering of quality scores of target entities. The histogram comprises individual points, each corresponding to an individual quality score. Alternatively, the histogram comprises buckets, each corresponding to a different range of quality scores. Each bucket may represent, for example, 5% of quality scores or 1% of quality scores. Thus, for example, the highest bucket may represent the top 1% of quality scores while the lowest bucket may represent the lowest 1% of quality scores.

In response to a content request associated with a target entity, content delivery system 120 identifies multiple content delivery campaigns and determines (e.g., computes) a quality score for the target entity relative to each identified content delivery campaign. Given a quality score for a particular content delivery campaign, a histogram of the particular content delivery campaign is identified and the quality score is used to determine a relative quality score from the histogram. For example, the quality score may fall within a range of the second bucket in the histogram, which is associated with a relative quality score. Thus, if ten content delivery campaigns are identified in response to the content request, then ten relative quality scores are determined, one for each content delivery campaign. The next step is to determine an adjustment factor for each relative quality score.

Adjustment Factor Mapping Functions

Different utilization strategies are associated with different mapping functions that map a relative quality score to an adjustment factor. An example mapping function is the following:

$$f_{\mu,\sigma}(p) = \frac{1}{2} erf\left(\frac{logit(p) - \mu}{\sqrt{2\sigma^2}}\right) + 1$$

where p is the relative quality score and two parameter values that affect the mapping function's curve are $\mu$ and $\sigma$.

Figure 2A:
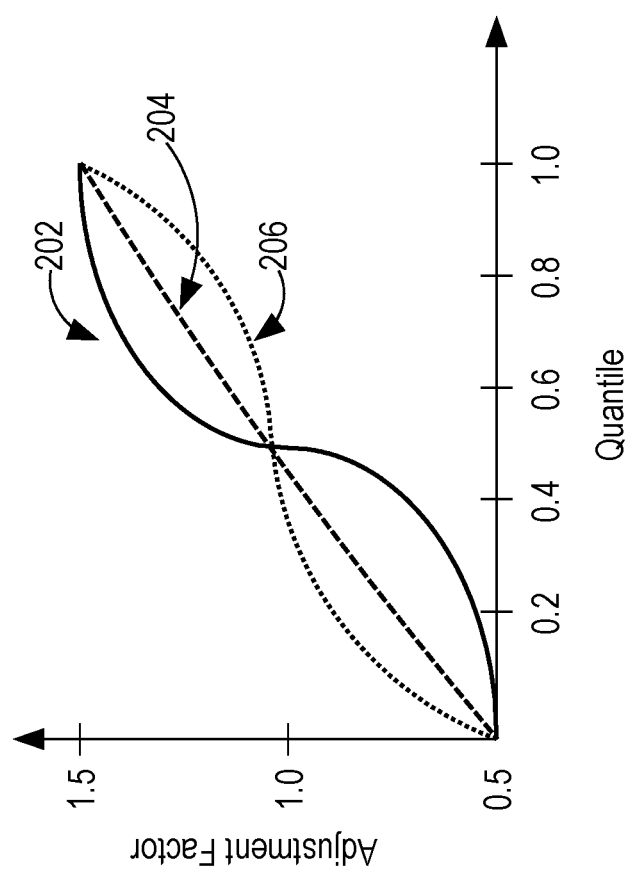
FIG. 2A is an example graph that maps relative quality scores to adjustment factors using different values for a particular parameter, in an embodiment.

FIG. 2A is an example graph 200 that maps a relative quality score to an adjustment factor using different values for $\sigma$ and keeping the value for $\mu$ constant (in this case 0). Graph 200 depicts three curves 202-206, one for each of the different values of $\sigma$. Each curve corresponds to a different utilization strategy. The more conservative the utilization strategy, the higher the value of $\sigma$. Conversely, the more aggressive the utilization strategy, the lower the value of $\sigma$. Thus, the value of $\sigma$ acts as a control knob for how aggressive or conservative resource utilization is.

A mapping function with a relatively high value of $\sigma$ (e.g., between 2.5 and 5.0) is referred to as a conservative mapping function, while a mapping function with a relatively low value of $\sigma$ (e.g., between 0.1 and 1.5) is referred to as aggressive mapping function, and a mapping function with a relatively moderate value of $\sigma$ (e.g., between 1.5 and 2.5) is referred to as a moderate mapping function. Thus, curve 202 corresponds to an aggressive mapping function, curve 204 corresponds to a moderate mapping function, and curve 206 corresponds to a conservative mapping function. For relative quality scores greater than and less than 50%, the slope of the curve of the mapping function is different, depending on the value of $\sigma$.

Figure 2B:
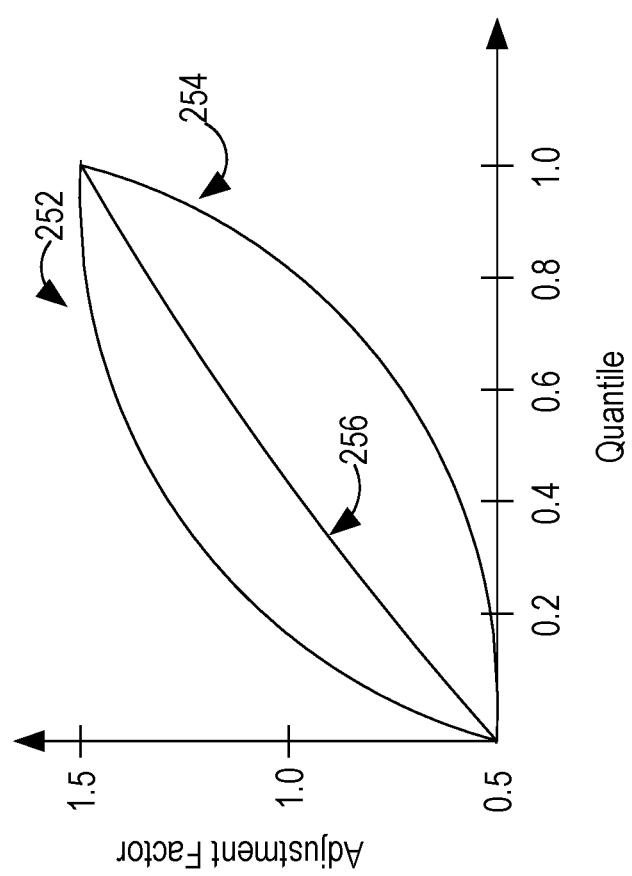
FIG. 2B is another example graph that maps relative quality scores to adjustment factors, in an embodiment.

Each mapping function reflected in FIG. 2A has the following properties:
  a relative quality score of 50% has an adjustment factor of 1;
  a relative quality score of 100% has an adjustment factor of 1.5;
  a relative quality score of 0% has an adjustment factor of 0.5;

In other embodiments, the mapping functions may have different properties. For example, the minimum adjustment factor may be different (e.g., 0 instead of 0.5) and the maximum adjustment factor may be different (e.g., 2 instead of 1.5). As another example, each curve might not have the property of going through the adjustment factor point of 1 at the relative quality score of 50%. Instead, for example as depicted in FIG. 2B, a curve 252 of an "aggressive" mapping function and a curve 254 of a "conservative" mapping function might have a continuous bow shape, whereas a curve 256 of a "moderate" mapping function may be a simple line with a constant slope.

Mapping Function Determination

A mapping function for a target entity of a content delivery campaign may be determined in one or more ways. In an embodiment, when a content provider selects a division of a resource, the content provider selects (implicitly or explicitly) a mapping function. For example, the mapping functions are predefined with default values for $\sigma$ and $\mu$. If a content provider selects a resource split, then one of the resource portions is automatically associated with one predefined mapping function and another resource portion is automatically associated with another pre-defined mapping function.

As another example, a content provider has more fine-grained control on how aggressive or conservative the content provider intends to be on resource utilization for each resource portion. A graphical utilization strategy scale may be displayed adjacent to each resource portion in a user interface, such as content provider interface 122. The graphical utilization strategy scale may have multiple (e.g., ten) different settings, each corresponding to a different value for σ. Thus, for example, a content provider may, when interacting with the graphical utilization strategy scale, select two or more different, but relatively aggressive, utilization strategies, each associated with a different value for σ.

Automatically Determining Mapping Functions Based on Target Audience

In another example, mapping functions are automatically determined based on historical interaction (e.g., click) data of multiple target entities. The historical interaction data might be restricted only based on time (e.g., the last four weeks) and/or may be limited to certain target entity segments. Each target entity segment corresponds to a set of target entity feature values or attributes that is different than the set of target entity feature values of any other target entity segment. Example features include job title, geography, job industry, skills, and seniority. Some target entity segments may have overlapping feature values in common, but not all. Thus, each target entity is assigned to a target entity segment based on the attributes (or feature values) of the target entity.

Each user interaction (e.g., click on a content item of a particular type) reflected in the historical interaction data is associated with a target entity, a content item that the target entity interacted with (e.g., selected), a content delivery campaign, a content item selection event, a quality score of the target entity, a bid price that was used to win the content item selection event, and one or more parameter values (e.g., a value for σ and, optionally, a value for μ) of a mapping function that was used to generate an adjustment factor for the content delivery campaign in the content item selection event. The parameter values may be limited to a certain discrete set, such as the following for σ: {0.1, 0.2, 0.5, 1.0, 2.0, 3.0, 4.0, 5.0}.

Figure 3:
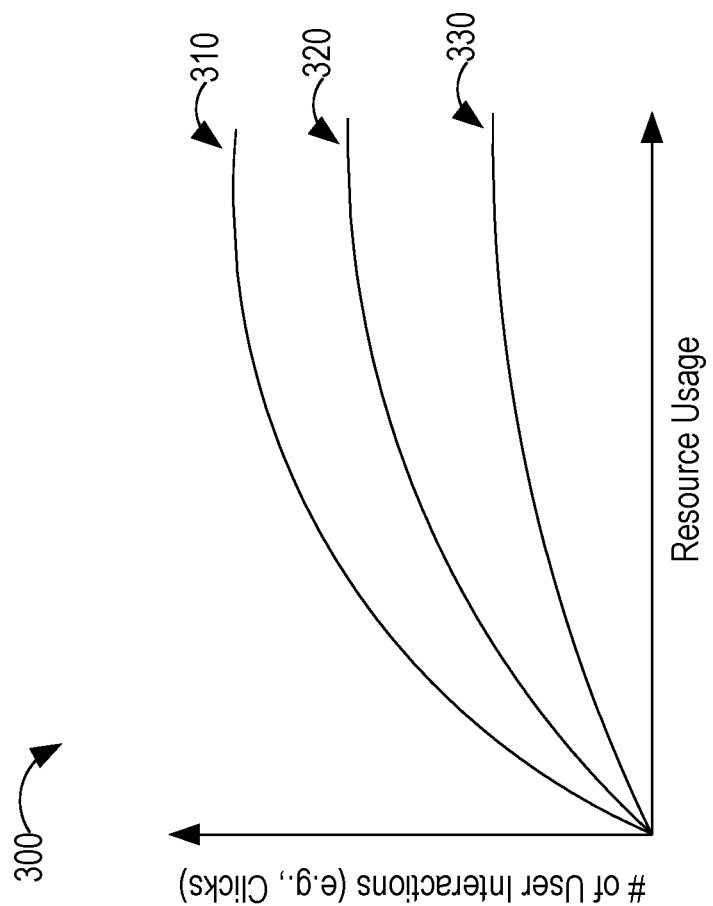
FIG. 3 is a chart that depicts an example lines that show relationships between resource usage and user clicks for different values of σ, in an embodiment.

Based on this historical interaction data, for each target entity segment, multiple lines may be generated, one for each value of σ. One dimension of each line (e.g., the y-axis) corresponds to the number of user interactions (e.g., clicks) while another dimension of each line (e.g., the x-axis) corresponds to resource usage. FIG. 3 is a chart 300 that depicts example lines 310-330 that show relationships between resource usage and number of user interactions (e.g., clicks) for different values of σ, in an embodiment. Each line is based on multiple points, each point corresponding to a unique user interaction reflected in the historical interaction data. In order to generate each line, multiple points (i.e., that share the same parameter value(s), such as a particular value of σ) are considered. In order to fit a line to the multiple points, an aggregation of the bid prices of the user interactions corresponding to the multiple points is determined. Examples of such aggregation include mean and median.

Once an aggregated point is determined for the first user interaction threshold (e.g., at the y-axis where y=1) for a particular σ value, a function for that particular σ value may be determined in one of multiple ways. The function is used to determine a projected or estimated amount of user interaction for the particular σ value given a resource amount in a range of resource amounts. For example, the function may be a linear function where the second user interaction threshold (e.g., y=2) for the particular σ value is determined by doubling the aggregated bid price associated with the first user interaction threshold, the third user interaction threshold (e.g., y=3) for the particular σ value is determined by tripling the aggregated bid price associated with the first user interaction threshold, and so forth. Another example of a function is an empirical value multiplied by the aggregated bid prices associated with the first user interaction threshold. Specifically, unique pairs of user interactions are considered to compute, for each pair, a combined bid price (since pairs of user interactions correspond to two user interactions); then, the combined bid prices are aggregated to compute an aggregated (e.g., a mean or median) bid price, which corresponds to a resource amount. The process repeats for combinations of three user interactions, combinations of four user interactions, etc., in order to generate points for the third user interaction threshold, the fourth user interaction threshold, and so forth.

Line 310 corresponds to one value of σ (e.g., 0.1, indicating a relatively aggressive resource utilization strategy), line 320 corresponds to another value of σ (e.g., 0.5 indicating a less aggressive resource utilization strategy), and line 330 corresponds to another value of σ (e.g., 5.0, indicating a relatively conservative resource utilization strategy). Also, each of lines 310-330 is associated with a different average (or median or other quantile) relative quality score (or different average quality score). For example, line 330 is associated with the highest relative quality score, line 320 is associated with a lower relative quality score, and line 310 is associated with the lowest relative quality score.

Once the lines are determined for a target entity segment, the resource split of a content delivery campaign may be used to select one or more values for σ. For example, given a 30/70 split where the resource total is 100 resource units and the 30 corresponds to resource units that will be processed using a conservative utilization strategy and 70 corresponds to resource units that will be processed using an aggressive utilization strategy, then a first point on a first line associated with the highest σ is identified, where the first point corresponds to 30 resource units. Then a second point on a second line associated with the next highest σ is identified, where the second point corresponds to 70 resource units. A summation of two values is computed: one value being the product of (i) a number of user interactions associated with the first point and (ii) a quality score associated with the first line; the other value being the product of (iii) a number of user interactions associated with the second point and (iv) a quality score associated with the second line. The number of user interactions associated with each point may be a non-integer value. The summation is recorded and compared to other summations that are computed in the same manner, except for different combinations of lines. The only restriction on the combination of lines is that the σ value for one line corresponding to a more conservative utilization strategy must be higher than the σ value for another line corresponding to a more aggressive utilization strategy. If there is more than one resource split or more than two resource portions, then the summation is of a number of values equal to the number of resource portions.

In a related embodiment, the lines that are considered in generating a summation are limited to having a minimum distance between the σ values of the respective lines. "Distance" may be defined as a number of σ values between the two σ values of the respective lines (e.g., at least three σ values), or a difference between the σ values of the respective lines (e.g., 0.5). For example, if the only σ values are {0.1, 0.2, 0.5, 1.0, 2.0, 3.0, 4.0, 5.0} and the distance is defined as three, then line combinations that may be considered are {0.1, 2.0} and {1.0, 5.0}, while line combinations that cannot be considered are {0.1, 0.5} and {2.0, 5.0}.

As another example, if the only σ values are {0.1, 0.2, 0.5, 1.0, 2.0, 3.0, 4.0, 5.0} and the distance is defined as a σ value difference of 0.5, then line combinations that may be considered are {0.1, 1.0} and {0.2, 1.0}, while line combinations that cannot be considered are {0.1, 0.2} and {0.2, 0.5}.

Of all the summations that are computed, one or more selection criteria are used to select a particular summation from the set of summations. An example selection criterion is the highest summation value. Once a summation is selected, the σ values corresponding to the selected summation are identified. For example, the σ values of 0.2 and 3.0 may have resulted in the highest summation. Mapping functions that correspond to the identified σ values may have already been generated. Either way, the content delivery campaign that corresponds to the identified σ values is updated to be associated with the mapping functions associated with the identified σ values. Specifically, a more conservative resource utilization strategy is associated with the more conservative mapping function (e.g., associated with the σ value of 3.0) while a more aggressive resource utilization strategy is associated with the more aggressive mapping function (e.g., associated with the σ value of 0.2).

Assigning a Content Request to a Mapping Function

After one or more mapping functions are identified for a content delivery campaign, each content request that is received and that is targeted by the content delivery campaign is assigned to one of the mapping functions. For example, if a content delivery campaign is associated with two mapping functions, then some content requests will be assigned to one of the mapping functions and other content requests will be assigned to the other mapping function.

The number of content requests that are assigned to a mapping function depends on the resource split specified by the content provider of the content delivery campaign. For example, if the resource split is 30/70 and there are two mapping functions A and B, then 30% of the resources are allocated to processing content requests assigned to mapping function A and 70% of the resources are allocated to processing content requests that are assigned mapping function B.

Thus, in response to content delivery system 120 receiving a content request for one or more content items and initiating a content item selection event in which multiple candidate content delivery campaigns are identified, the content request may be assigned to one of multiple mapping functions. The assignment to a mapping function may be performed in one or more ways. For example, the assignment may be random subject to hitting the resource portion associated with the mapping function. For example, in a 30/70 split, a random assignment of content requests to mapping functions may result in zero resources left for the 30% portion and 40% of the resources left for the 70% portion. After the 30% portion is exhausted, any subsequent content requests are assigned to the mapping function associated with the 70% portion.

As a similar example, the mapping function assignment may be based on the ratio of the split or the ratio of the remaining resources in each resource portion. For example, for the first content request, the probability of the first content request being assigned to the 30% portion is 30% and the probability of the first content request being assigned to the 70% portion is 70%. Then, for a second content request when the resource portions are 20% and 40%, respectively, the probability of the second content request being assigned to the 20% portion is 33% and the probability of the first content request being assigned to the 40% portion is 67%.

Process Overview

Figure 4:
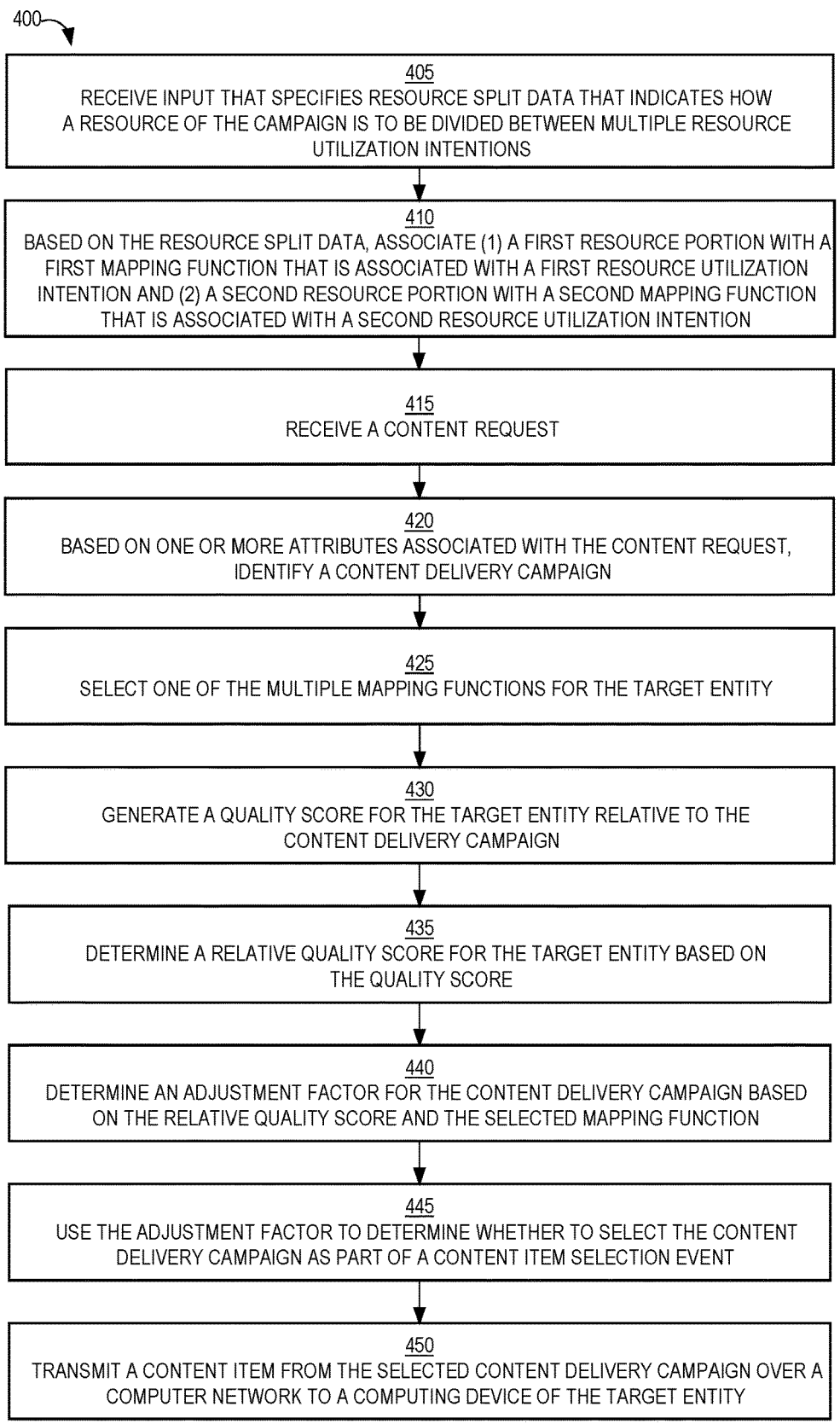
FIG. 4 is a flow diagram that depicts an example process for allowing content providers to have different resource utilization strategies for their respective content delivery campaigns, in an embodiment.

FIG. 4 is a flow diagram that depicts an example process 400 for allowing content providers to have different resource utilization strategies, in an embodiment. Process 400 may be performed by different elements or components of content delivery system 120.

At block 405, input is received that specifies resource split data that indicates how a resource of a content delivery campaign is to be divided between at least two resource utilization strategies. The resource split data may be determined automatically or the input may be received from a content provider of the content delivery campaign. Block 405 may be part of a content delivery campaign creation process where the content provider specified targeting criteria, a total resource amount, and one or more objectives of the content delivery campaign, and uploaded media items that are used to generate one or more content items of the campaign.

At block 410, based on the resource split data, a first resource portion is associated with a first mapping function that is associated with a first utilization strategy and a second resource portion is associated with a second mapping function that is different than the first mapping function and that is associated with a second utilization strategy that is different than the first utilization strategy.

At block 415, a content request is received. Block 415 may involve content delivery system 120 receiving the content request from client device 142. The content request may have been initiated based on a web application executing on client device 142 processing web content that the client device 142 retrieved from publisher system 130.

At block 420, based on one or more attributes associated with the content request, the content delivery campaign is identified. For example, the one or more attributes satisfy the targeting criteria of the content delivery campaign. The attributes may be attributes of a user of the client device that initiated the content request and/or attributes of the context (e.g., time of day, day of week, and type of web content requested, entities identified in the web content). Block 420 may involve identifying tens or hundreds of content delivery campaigns in under a second.

Block 420 may involve identifying multiple content delivery campaigns. Some of the identified content delivery campaigns might not be associated with any resource utilization strategy and, thus, any mapping function while other of the identified content delivery campaigns might be associated with the same or different utilization strategies as the identified content delivery campaign.

At block 425, one of multiple mapping functions is selected for the target entity. Block 425 may be performed based on resources remaining of each resource portion of the content delivery campaign. For example, if the remaining of the first resource portion is larger than the remaining of the second resource portion, then the mapping function associated with the first resource portion is selected. As another example, the mapping function is randomly selected from a set of mapping functions as long as each mapping function in the set is associated with a resource portion that has remaining resources (e.g., is greater than zero).

If multiple content delivery campaigns are identified in block 420 and each of those campaigns also has a resource split (which may be different than the resource split in block 405), then block 425 may involve selecting a mapping function for each of those campaigns.

At block 430, a quality score is generated for the target entity relative to the content delivery campaign. The quality score may reflect (a) a quantitative measurement of a likelihood that the target entity will perform a particular action (e.g., select a content item of the content delivery campaign, apply to a job posting reflected in the content item, or accept an offer of employment from a job provider associated with the campaign) and/or (b) a relevancy of the content of the content item to the target entity. The quality score may be generated based on a machine-learned model that takes, as input, attributes of the target entity, the content delivery campaign, and/or the viewing context.

At block 435, a relative quality score is determined for the target entity based on the quality score. A histogram of quality scores may have been generated for a target audience (comprising multiple, e.g., thousands of, target entities) of the content delivery campaign prior to block 415. The histogram orders quality scores from lowest to highest or vice versa in order to determine to which percentile or quantile each quality score maps. Generally, the higher the quality score, the higher the relative quality score.

At block 440, an adjustment factor is determined for the content delivery campaign based on the relative quality score and the selected mapping function. The mapping function takes a relative quality score as input and produces the adjustment factor as output.

At block 445, the adjustment factor is used to determine whether to select the content delivery campaign as part of a content item selection event. Block 445 may involve multiplying a bid price associated with the content delivery campaign by the adjustment factor to generate a modified bid price and, ultimately, a campaign score. An example campaign score for a particular content delivery campaign is a product of a (modified) bid price of the particular content delivery campaign and a predicted user selection rate of the target entity with respect to the particular content delivery campaign. Block 445 may involve comparing campaign scores of multiple content delivery campaigns and selecting the campaign that is associated with the highest score.

At block 450, a content item of the selected content delivery campaign is transmitted over a computer network to a computing device of the target entity, such as the computing device that transmitted the content request to content delivery system 120, which content request initiated the content item selection event. The selected content delivery campaign may or may not be one that is associated with one or more resource utilization strategies or with resource split data.

While process 400 is described and depicted as being performed in a particular order, embodiments may involve a different order, such as block 425 occurring after block 435.

Blocks 415-450 may be performed in real-time or near real-time (e.g., within one second) so that a requesting user is able to view the selected content item without a noticeable delay. Also, content delivery system 120 may be able to process thousands and tens of thousands of content item selection events simultaneously.

Selecting a Single Resource Utilization Strategy

In a related embodiment, instead of associating different portions of a campaign's resource amount with different resource utilization strategies, a content delivery campaign is associated with a single resource utilization strategy that is selected by the content provider of the content delivery campaign. For example, content provider interface 122 presents multiple selectable resource utilization strategies. The strategies may be discrete or continuous. For example, a user interface slider element may allow a content provider to specify how conservative or aggressive resource utilization will be for the content delivery campaign. The slider element may be on a discrete scale (where a discrete set of options are available, such as four options) or a continuous scale (where many more options are available, such as a hundred, but seemingly unlimited). Each option on the scale is mapped to a different σ value.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
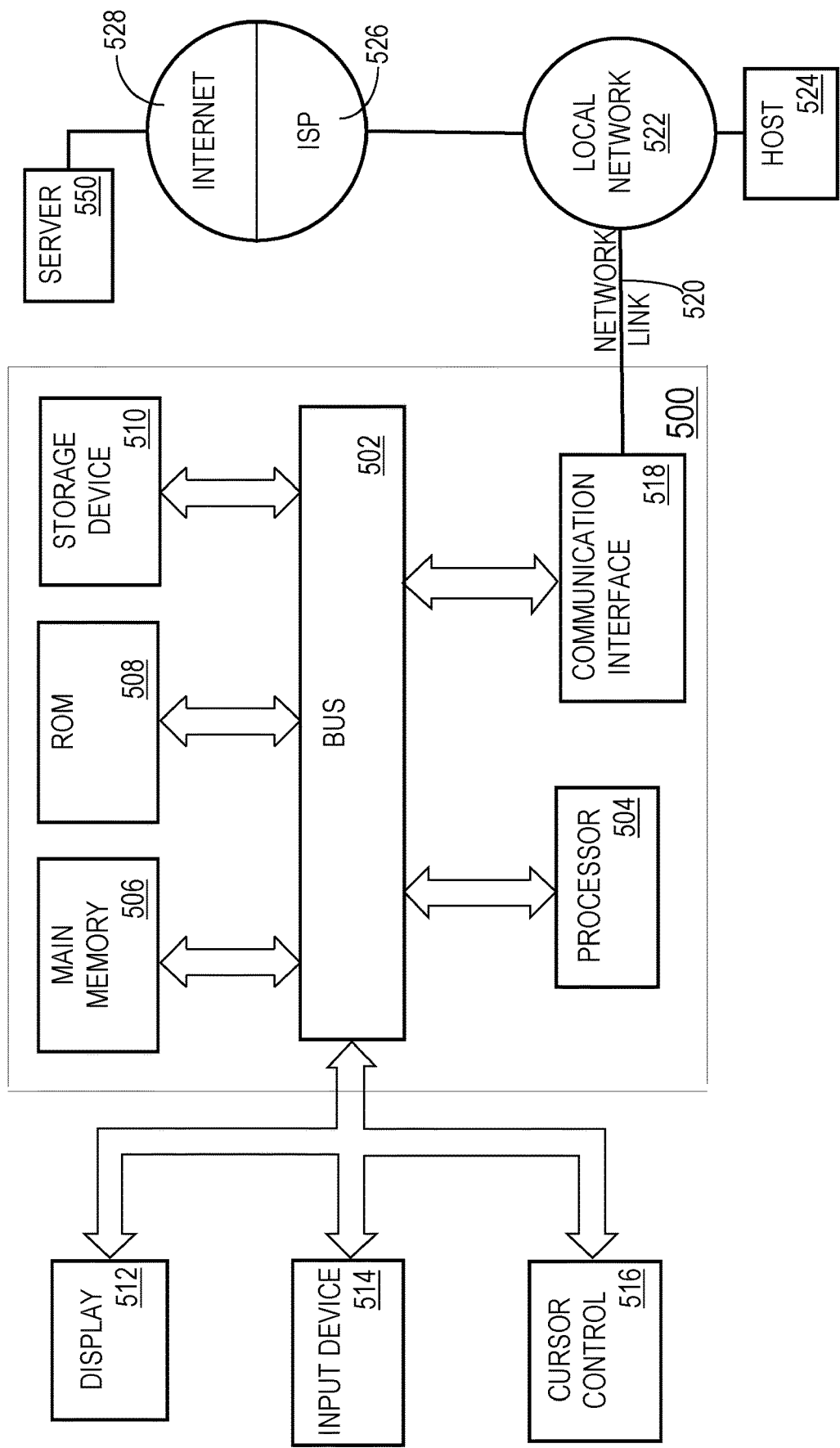
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
receiving resource split data that indicates a split of a total resource amount that is associated with a content delivery campaign;
in response to receiving the resource split data, determining, based on the split,
a first resource amount that is a subset of the total resource amount and that is associated with a first utilization strategy and
a second resource amount that is a subset of the total resource amount and that is associated with a second utilization strategy that is different than the first utilization strategy;
storing association data that associates the first resource amount with a first mapping function and the second resource amount with a second mapping function that is different than the first mapping function;
in response to receiving a first request from a first client device:
determining that a first entity of the first client device satisfies one or more targeting criteria of the content delivery campaign;
associating the first entity with the first mapping function;
determining a first quality score for the first entity wherein determining the first quality score for the first entity comprises: identifying a first set of feature values of the first entity and a second set of feature values of the content delivery campaign;
inputting the first set of feature values and the second set of feature values into a machine-learned model that outputs the first quality score;
based on the first mapping function and the first quality score, determining a first adjustment factor; and
conducting a first content item selection event based on the first adjustment factor;
wherein the method is performed by one or more computing devices.

2. The method of claim 1, further comprising: in response to receiving a second request from a second client device:
determining that a second entity of the second client device is associated with the content delivery campaign;
determining to associate the second entity with the second mapping function that is different than the first mapping function; determining a second quality score for the second entity;
based on the second mapping function and the second quality score, determining a second adjustment factor;
conducting a second content item selection event based on the second adjustment factor.

3. The method of claim 1, wherein the first utilization strategy prioritizes target entity quality and the second utilization strategy prioritizes an amount of target entity interactions.

4. The method of claim 1, wherein the content delivery campaign is a first content delivery campaign, the method further comprising, in response to receiving the first request:
identifying a plurality of content delivery campaigns that includes the first content delivery campaign and a second content delivery campaign that is different than the first content delivery campaign;
wherein the second content delivery campaign is not associated with any mapping function that is associated with a resource utilization strategy.

5. The method of claim 1, further comprising, prior to receiving the first request: receiving, from a computing device associated with a content provider of the content delivery campaign, the one or more targeting criteria and the resource split data.

6. The method of claim 1, wherein the content delivery campaign is a campaign to delivery opportunity postings to potential applicants of an opportunity.

7. The method of claim 1, further comprising: based on the first quality score, determining a first relative quality score for the first entity, wherein determining the first adjustment factor is also based on the first relative quality score.

8. The method of claim 7, further comprising: receiving, from a particular client device, targeting criteria that is associated with the content delivery campaign;
identifying a plurality of target entities that satisfy at least a portion of the targeting criteria;
generating a plurality of quality scores, each quality score for a different entity in the plurality of target entities;
generating a distribution of the plurality of quality scores;
wherein determining the first relative quality score comprises:
based on the distribution, determining a first percentile or quantile of the first quality score;
determining the first relative quality score based on the first percentile or quantile.

9. A method comprising:
receiving, from a particular client device, first input that indicates a set of targeting criteria for a content delivery campaign;
receiving, from the particular client device, second input that indicates a resource utilization strategy from among a plurality of resource utilization strategies;
based on the second input:
associating the resource utilization strategy with a resource amount associated with the content delivery campaign;
associating a first mapping function, from among a plurality of mapping functions, with the resource amount;
in response to receiving a first request from a first client device:
determining that a first entity of the first client device is associated with the content delivery campaign;
associating the first entity with a first mapping function;
determining a first quality score for the first entity wherein determining the first quality score for the first entity comprises: identifying a first set of feature values of the first entity and a second set of feature values of the content delivery campaign;
inputting the first set of feature values and the second set of feature values into a machine-learned model that outputs the first quality score;
based on the first quality score, determining a first relative quality score for the first entity;
based on the first mapping function and the first quality score, determining a first adjustment factor; and
conducting a first content item selection event based on the first adjustment factor;
wherein the method is performed by one or more computing devices.

10. The method of claim 9, further comprising, prior to receiving the first request:
identifying a plurality of target entities that satisfy at least a portion of the set of targeting criteria;
generating a plurality of quality scores, each quality score for a different entity in the plurality of target entities;
generating a distribution of the plurality of quality scores;
wherein determining the first relative quality score comprises: based on the distribution, determining a first percentile or quantile of the first quality score; determining the first relative quality score based on the first percentile or quantile.

11. One or more non-transitory storage media storing instructions which, when executed by one or more processors, cause: receiving resource split data that indicates a split of a total resource amount that is associated with a content delivery campaign;
in response to receiving the resource split data, determining, based on the split,
a first resource amount that is a subset of the total resource amount and that is associated with a first utilization strategy and a second resource amount that is a subset of the total resource amount and that is associated with a second utilization strategy that is different than the first utilization strategy; storing association data that associates the first resource amount with a first mapping function and the second resource amount with a second mapping function that is different than the first mapping function;
in response to receiving a first request from a first client device:
determining that a first entity of the first client device satisfies one or more targeting criteria of the content delivery campaign;

associating the first entity with the first mapping function;

determining a first quality score for the first entity, wherein determining the first quality score for the first entity comprises:

identifying a first set of feature values of the first entity and a second set of feature values of the content delivery campaign;

inputting the first set of feature values and the second set of feature values into a machine-learned model that outputs the first quality score;

based on the first mapping function and the first quality score, determining a first adjustment factor; and conducting a first content item selection event based on the first adjustment factor.

12. The one or more non-transitory storage media of claim 11, wherein the instructions, when executed by the one or more processors, further cause:

in response to receiving a second request from a second client device;

determining that a second entity of the second client device is associated with the content delivery campaign;

determining to associate the second entity with the second mapping function that is different than the first mapping function;

determining a second quality score for the second entity;

based on the second mapping function and the second quality score, determining a second adjustment factor; and conducting a second content item selection event based on the second adjustment factor.

13. The one or more non-transitory storage media of claim 11, wherein the first utilization strategy prioritizes target entity quality and the second utilization strategy prioritizes an amount of target entity interactions.

14. The one or more non-transitory storage media of claim 11, wherein the content delivery campaign is a first content delivery campaign, wherein the instructions, when executed by the one or more processors, further cause, in response to receiving the first request:

identifying a plurality of content delivery campaigns that includes the first content delivery campaign and a second content delivery campaign that is different than the first content delivery campaign;

wherein the second content delivery campaign is not associated with any mapping function that is associated with a resource utilization strategy.

15. The one or more non-transitory storage media of claim 11, wherein the instructions, when executed by the one or more processors, further cause, prior to receiving the first request: receiving, from a computing device associated with a content provider of the content delivery campaign, the one or more targeting criteria and the resource split data.

16. The one or more non-transitory storage media of claim 11, wherein the content delivery campaign is a campaign to delivery opportunity postings to potential applicants of an opportunity.

17. The one or more non-transitory storage media of claim 11, wherein the instructions, when executed by the one or more processors, further cause:

based on the first quality score, determining a first relative quality score for the first entity, wherein determining the first adjustment factor is also based on the first relative quality score.

18. The one or more non-transitory storage media of claim 17, wherein the instructions, when executed by the one or more processors, further cause: receiving, from a particular client device, targeting criteria that is associated with the content delivery campaign;

identifying a plurality of target entities that satisfy at least a portion of the targeting criteria;

generating a plurality of quality scores, each quality score for a different entity in the plurality of target entities;

generating a distribution of the plurality of quality scores;

wherein determining the first relative quality score comprises:

based on the distribution, determining a first percentile or quantile of the first quality score;

determining the first relative quality score based on the first percentile or quantile.

* * * * *